US012682072B2

(12) United States Patent
Ezrielev et al.

(10) Patent No.: US 12,682,072 B2
(45) Date of Patent: Jul. 14, 2026

(54) SYSTEM AND METHOD FOR GENERATION AND DISTRIBUTION OF SECURITY MODELS

(71) Applicant: Dell Products L.P., Round Rock, TX (US)

(72) Inventors: Ofir Ezrielev, Be'er Sheva (IL); Tomer Kushnir, Omer (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 461 days.

(21) Appl. No.: 18/309,259

(22) Filed: Apr. 28, 2023

(65) Prior Publication Data

US 2024/0362339 A1 Oct. 31, 2024

(51) Int. Cl.
*G06F 21/57* (2013.01)
*G06N 5/04* (2023.01)

(52) U.S. Cl.
CPC ............. *G06F 21/577* (2013.01); *G06N 5/04* (2013.01); *G06F 2221/033* (2013.01)

(58) Field of Classification Search
CPC .... H04L 63/205; H04L 63/20; H04L 63/1441
See application file for complete search history.

(56) References Cited

U.S. PATENT DOCUMENTS

| | | | |
|---|---|---|---|
| 6,742,128 | B1 | 5/2004 | Joiner |
| 7,159,210 | B2 | 1/2007 | Griffin |
| 7,908,653 | B2 | 3/2011 | Brickell |
| 8,368,915 | B1 | 2/2013 | Feeser |
| 8,516,596 | B2 | 8/2013 | Sandoval |
| 10,540,960 | B1 | 1/2020 | Jones |
| 11,119,882 | B2 | 9/2021 | Rakshit |
| 11,184,401 | B2 | 11/2021 | Crabtree |
| 11,750,657 | B2 | 9/2023 | Hader |
| 11,907,407 | B2 | 2/2024 | Hadar |
| 12,299,430 | B2 | 5/2025 | Cardozo |
| 2005/0010819 | A1 | 1/2005 | Williams |
| 2008/0016339 | A1 | 1/2008 | Shukla |
| 2008/0282345 | A1 | 11/2008 | Beals |
| 2010/0031308 | A1 | 2/2010 | Khalid |
| 2013/0152047 | A1 | 6/2013 | Moorthi |
| 2015/0026767 | A1 | 1/2015 | Sweet |
| 2015/0046125 | A1 | 2/2015 | Jagiella |

(Continued)

FOREIGN PATENT DOCUMENTS

WO 2022101656 A1 5/2022

OTHER PUBLICATIONS

Esteban, Jonathan, "Simulating Network Lateral Movements through the CyberBattleSim Web Platform", Diss. Massachusetts Institute of Technology, 2022, pp. 1-66 (66 pages).

(Continued)

*Primary Examiner* — Michael R Vaughan
(74) *Attorney, Agent, or Firm* — WOMBLE BOND DICKINSON (US) LLP

(57) ABSTRACT

Methods and systems for securing deployments are disclosed. The deployments may be secured by generating and deploying security models to components of the deployment. The security models may be obtained through simulation of the operation of the deployment. During the simulation, different types of attacks on its operation and potential defenses to the attacks may be evaluated. The defenses able to defend against the different types of attacks may be used to generate the security models.

20 Claims, 7 Drawing Sheets

(56) References Cited

U.S. PATENT DOCUMENTS

| | | |
|---|---|---|
| 2015/0089502 A1 | 3/2015 | Horovitz |
| 2016/0308895 A1 | 10/2016 | Kotler |
| 2017/0041317 A1 | 2/2017 | Kurian |
| 2017/0041322 A1 | 2/2017 | Kurian |
| 2017/0060607 A1 | 3/2017 | Hollinger |
| 2017/0214701 A1 | 7/2017 | Hasan |
| 2019/0034636 A1 | 1/2019 | Gopinath |
| 2019/0173919 A1 | 6/2019 | Irimie |
| 2019/0196952 A1 | 6/2019 | Manchiraju |
| 2019/0213104 A1 | 7/2019 | Qadri |
| 2019/0349426 A1 | 11/2019 | Smith |
| 2020/0048866 A1 | 2/2020 | Weber |
| 2020/0081445 A1 | 3/2020 | Stetson |
| 2020/0092322 A1 | 3/2020 | Boss |
| 2020/0250295 A1 | 8/2020 | Padmanabhan |
| 2020/0411168 A1 | 12/2020 | Thomas |
| 2021/0097186 A1 | 4/2021 | Mandal |
| 2021/0168175 A1 | 6/2021 | Crabtree |
| 2021/0211438 A1 | 7/2021 | Trim |
| 2021/0248229 A1 | 8/2021 | Kras |
| 2021/0273978 A1 | 9/2021 | Hadar |
| 2021/0374032 A1 | 12/2021 | Rakshit |
| 2022/0114310 A1 | 4/2022 | Berti |
| 2022/0137611 A1 | 5/2022 | Naito |
| 2022/0197231 A1 | 6/2022 | Kim |
| 2022/0210200 A1 | 6/2022 | Crabtree |
| 2022/0253534 A1 | 8/2022 | Biswas |
| 2022/0299988 A1 | 9/2022 | Nair |
| 2022/0327476 A1 | 10/2022 | Shanmugavelayudam |
| 2023/0058974 A1 | 2/2023 | Yan |
| 2023/0067128 A1 | 3/2023 | Engelberg |
| 2023/0077780 A1 | 3/2023 | Decrop |
| 2023/0082761 A1 | 3/2023 | Ruan |
| 2023/0117225 A1 | 4/2023 | Porto Guedes |
| 2023/0367911 A1 | 11/2023 | Balber |
| 2023/0376236 A1 | 11/2023 | Langer |
| 2024/0003242 A1 | 1/2024 | Ambade |
| 2024/0077867 A1 | 3/2024 | Mene |
| 2024/0089284 A1 | 3/2024 | Rieger |
| 2024/0169050 A1 | 5/2024 | Gehtman |
| 2024/0177067 A1 | 5/2024 | Ezrielev |
| 2024/0273411 A1 | 8/2024 | Mueck |
| 2024/0273434 A1 | 8/2024 | Jiang |
| 2024/0314158 A1 | 9/2024 | Bourzikas |
| 2024/0348664 A1 | 10/2024 | Mohanram |
| 2024/0354657 A1 | 10/2024 | Li |
| 2024/0362145 A1 | 10/2024 | Ezrielev |
| 2024/0364534 A1 | 10/2024 | Ezrielev |
| 2025/0007945 A1 | 1/2025 | Rieger |
| 2025/0039236 A1 | 1/2025 | Ignatius |
| 2025/0133017 A1 | 4/2025 | Langer |

OTHER PUBLICATIONS

Juan R. Trocoso-Pastoriza et al., "Orchestrating Collaborative Cybersecurity: A Secure Framework for Distributed Privacy-Preserving Threat Intelligence Sharing", arXiv:2209.02676v1, Sep. 6, 2022, retrieved from "arXiv preprint arXiv:2209.02676", pp. 1-31 (31 pages).

Thomas Kunz et al., "A Multiagent CyberBattleSim for RL Cyber Operation Agents", 2022 International Conference on Computational Science and Computational Interllogence (SCCI), Las Vegas, NV, USA, 2022, pp. 897-903 (7 pages).

Viadislav D. Veksler et al., "Simulations in Cyber-Security: A Review of Cognitive Modeling of Network Attackers, Defenders, and Users", Frontiers in Psychology, vol. 9, No. 691, May 15, 2018, pp. 1-12 (12 pages).

Igor Kotenko et al., "Agent-based modeling and simulation of botnets and botnet defense", Conference on Cyber Conflict, CCD COE Publications, Tallonn, Estonia, 2010, pp. 21-44 (24 pages).

Wang, Haozhe, et al. "A graph neural network-based digital twin for network slicing management." IEEE Transactions on Industrial Informatics 18.2 (2020): 1367-1376. (11 Pages).

Almasan, Paul, et al. "Digital twin network: Opportunities and challenges." arXiv preprint arXiv:2201.01144 (2022). (7 Pages).

Hu, Weifei, et al. "Digital twin: A state-of-the-art review of its enabling technologies, applications and challenges." Journal of Intelligent Manufacturing and Special Equipment 2.1 (2021): 1-34. (34 Pages).

Khan, Latif U., et al. "Digital-twin-enabled 6G: Vision, architectural trends, and future directions." IEEE Communications Magazine 60.1 (2022): 74-80. (7 Pages).

Nguyen, Huan X., et al. "Digital twin for 5G and beyond." IEEE Communications Magazine 59.2 (2021): 10-15. (13 Pages).

Wang, Danshi, et al. "The role of digital twin in optical communication: fault management, hardware configuration, and transmission simulation." IEEE Communications Magazine 59.1 (2021): 133-139. (6 Pages).

Pang, Toh Yen, et al. "Developing a digital twin and digital thread framework for an 'Industry 4.0' Shipyard." Applied Sciences 11.3 (2021): 1097. (22 Pages).

Isto, Pekka, et al. "5G based machine remote operation development utilizing digital twin." Open Engineering 10.1 (2020): 265-272. (8 Pages).

Rovira-Sugranes, Arnau, et al. "A review of AI-enabled routing protocols for UAV networks: Trends, challenges, and future outlook." Ad Hoc Networks 130 (2022): 102790. (30 Pages).

Alcaraz, Cristina, and Javier Lopez. "Digital twin: A comprehensive survey of security threats." IEEE Communications Surveys & Tutorials 24.3 (2022): 1475-1503.

Masi, Massimiliano, et al. "Securing critical infrastructures with a cybersecurity digital twin." Software and Systems Modeling 22.2 (2023): 689-707.

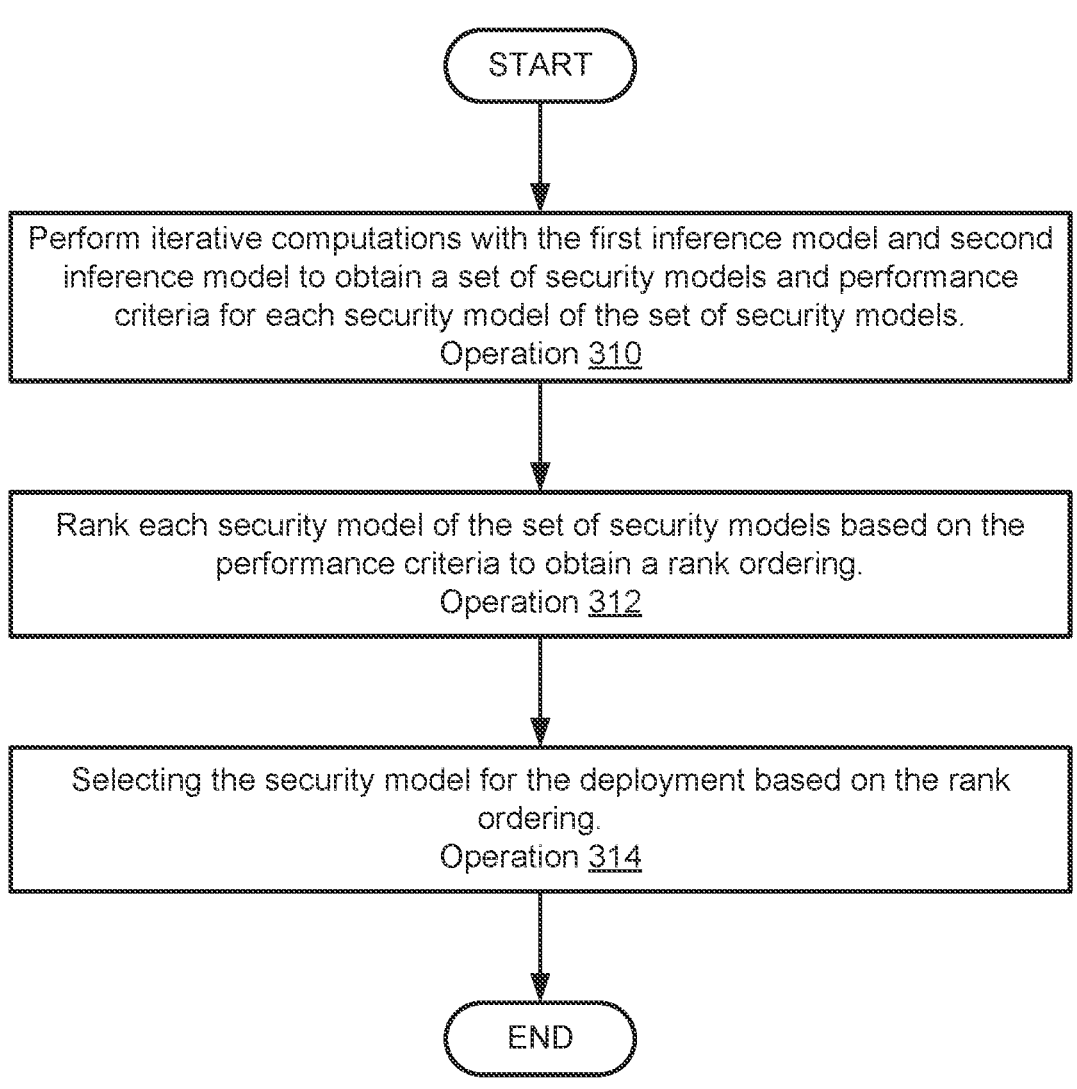

START

Perform iterative computations with the first inference model and second inference model to obtain a set of security models and performance criteria for each security model of the set of security models.
Operation 310

Rank each security model of the set of security models based on the performance criteria to obtain a rank ordering.
Operation 312

Selecting the security model for the deployment based on the rank ordering.
Operation 314

END

FIG. 3B

SYSTEM AND METHOD FOR GENERATION AND DISTRIBUTION OF SECURITY MODELS

FIELD

Embodiments disclosed herein relate generally to device management. More particularly, embodiments disclosed herein relate to systems and methods to managing security models for device management.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 3A-3B show flow diagrams illustrating a method of managing operation of data processing systems in accordance with an embodiment.

DETAILED DESCRIPTION

Figure 1:
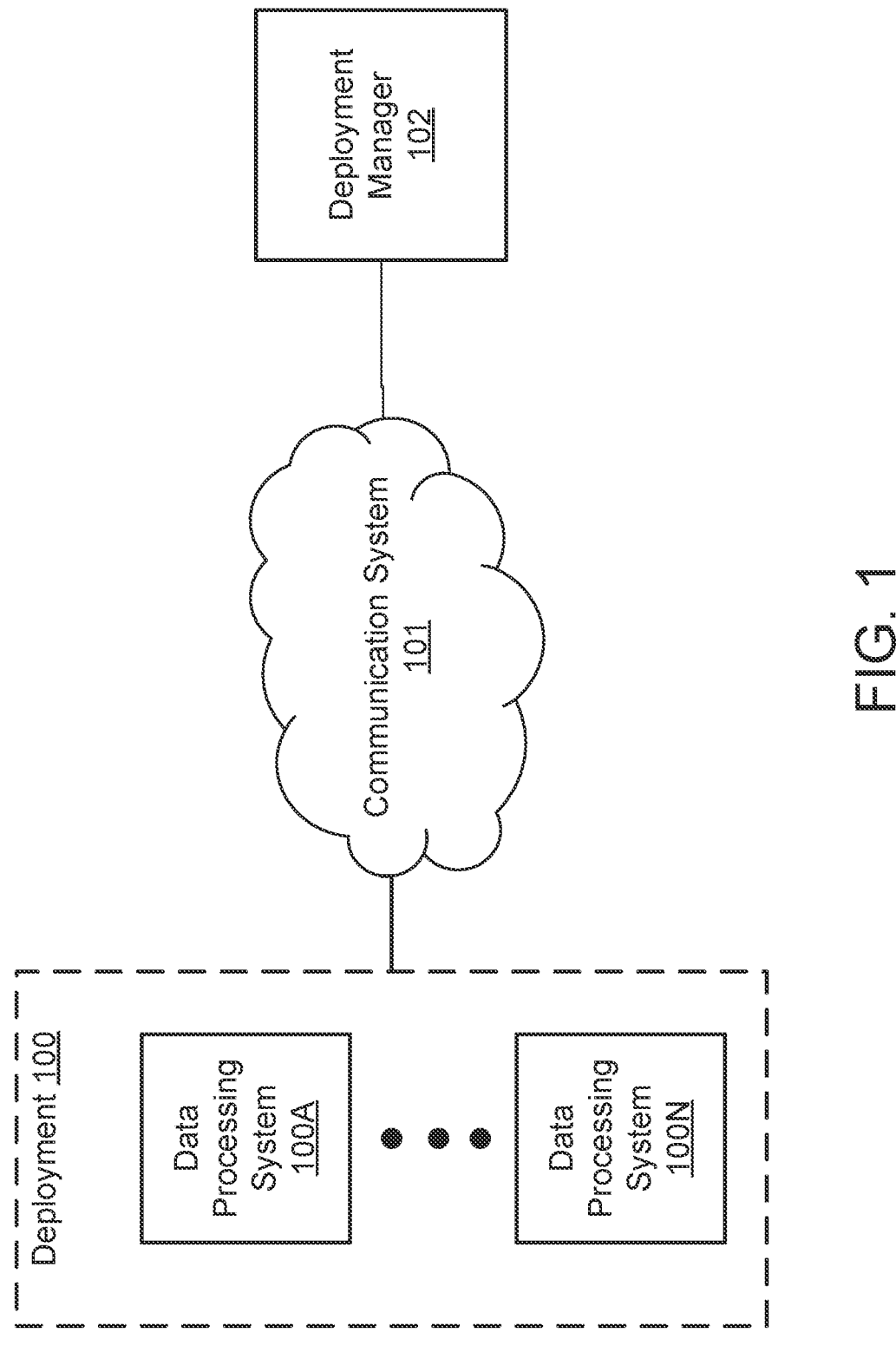
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. To manage the operation of data processing systems, security models may be deployed to the data processing systems to manage attacks on the operation of the data processing systems.

To deploy the security models, a simulation process may be implemented to obtain the security models. The simulation process may include (i) identification of potential attacks on the operation of the data processing systems through a first inference model, (ii) identification of potential defenses to the attacks through a second inference model, and (iii) simulation of the attacks and defenses through use of a digital twin for the data processing systems.

During the simulation process, an iterative process of testing different attacks and defenses may be performed. As part of the iterative process, a reinforced learning process may be performed for the first and second inference models. The reinforced learning process may improve the likelihood that the first and second inference models select successful attacks and defenses, respectively.

Once the iterative process is complete, a security model may be established based on the level of success of the simulated defenses to the attacks. The security model may then be deployed to the data processing systems. Once deployed, the security model may guide response to attacks on the operation of the data processing systems.

By doing so, embodiments disclosed herein may address, among others, the technical challenge of malicious attacks on the operation of data processing systems in distributed environments. To provide their functionalities, data processing systems may need to operate within distributed environments which subject them to such attacks. However, due to the variety of potential attacks, it may be challenging to identify how to respond to all potential types of attacks. Through iterative simulation and reinforced learning, the disclosed system may be more likely to generate security models that are able to appropriately respond to a broader array of attacks than security models that may be statically defined based on subject matter expert knowledge. Accordingly, embodiments disclosed herein may provide improved data processing systems that are less susceptible to malicious attacks.

In an embodiment, a method for securing a deployment is disclosed. The method may include obtaining a digital twin model for the deployment, the digital twin model being adapted to replicate operation of the deployment in a digital environment; obtaining a first inference model adapted to select first parameters to disrupt operation of the digital twin model; obtaining a second inference model adapted to select second parameters to prevent the disruption of the operation of the digital twin model; obtaining a security model for the deployment using the first inference model, the second inference model, and the digital twin model; and deploying the security model to the deployment to secure the deployment.

Obtaining the first inference model may include identifying a type of inference model to select the first parameters; and generating an instance of the type of the inference model.

Identifying the type of inference model may include identifying a first set of manipulable operations of the digital twin model; identifying first operating metrics of the digital twin model that are monitorable; and using the first set of manipulable operations and the first operating metrics to discriminate the type of the inference model from other types of inference models.

The first inference model may be based on a type of inference model, and the type of the inference model is based on: a first set of manipulable operations of the digital twin model, and first operating metrics of the digital twin model that are monitorable.

Obtaining the second inference model may include identifying a type of inference model to select the second parameters; and generating an instance of the type of the inference model.

Identifying the type of inference model may include identifying a second set of manipulable operations of the digital twin model; identifying second operating metrics of the digital twin model that are monitorable; and using the second set of manipulable operations and the second operating metrics to discriminate the type of the inference model from other types of inference models.

The second inference model may be based on a type of inference model, and the type of the inference model is based on: a second set of manipulable operations of the digital twin model, and second operating metrics of the digital twin model that are monitorable.

Obtaining the security model for the deployment may include performing iterative computations with the first and second inference models to obtain a set of security models; and ranking the security models based on performance criteria; and selecting the security model for deployment based on the rank ordering.

Performing the iterative computations with the first and second inference models to obtain the set of security models may include running training cycles with the first inference model with the digital twin; running training cycles with the second inference model with the digital twin; and producing a security model optimized for performance through training cycles with the first inference model and second inference model.

Running training cycles with the first inference model with the digital twin may include selecting the first parameters; running the first inference model using the first parameters; obtaining operating metrics from the first inference model using the first parameters; and using the operating metrics to update operation of the first inference model to select a new set of first parameters.

Running training cycles with the second inference model with the digital twin may include selecting the second parameters; running the second inference model using the second parameters; obtaining operating metrics from the second inference model using the second parameters; and using the operating metrics to update operation of the second inference model to select a new set of second parameters.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, the system of FIG. 1 may include deployment 100. Deployment 100 may provide all or a portion of the computer-implemented services. To provide its functionality, deployment 100 may include any number of data processing system 100A-100N.

To provide the computer implemented services, any of data processing systems 100A-100N may need to operate in a predetermined manner. For example, data processing systems may need to be able to communicate with one another and through which data used in the computer implemented services may be exchanged. To communicate with one another, data processing systems may be configured in different manners. The manner of configuration may impact how data processing systems communicate with one another and how data may be exchange between data processing systems. The configurations may be one or more types, and not limited to, the following example configurations: static, transactional, federated, and/or centralized or a combination thereof. Each of these types of configurations is discussed below.

Static configuration data processing systems may be fed data which may be input by users/devices, and may unchanged the data. Static configurations may be used for managing and sharing data with users and may facilitate queries through search algorithms to facilitate reporting and data analysis.

Where static configuration data processing systems may provide a non-dynamic management protocol for handling data, transactional configuration data processing systems may facilitate recordation of and tracking of data transactions. The transactions may be treated as events in which the data is introduced or changed. Thus, data may not be fixed but rather may be permitted to change and the transactions may account for when and how the data changes.

Where static and transactional configuration data processing systems may account for singular data processing systems, federated configuration data processing systems may include a collection of data processing systems that may or may not be autonomous and different in design. This configuration may include one or more static and transaction configurations, which may be allowed to share data between data processing systems. Each system may maintain control over data within its domain, but requests may need to be made between systems to render data as sharable. Given the autonomy that might exist within a federated configuration, the interoperability between data processing systems may be defined by a set of rules or procedures which regulate the interactions and sharing of data.

Where federated configuration data processing systems may define a loose collection of autonomous data processing systems, centralized configuration data processing systems may differ from a federated configuration in that one data processing system may enforce interoperability and data sharing interactions between the remaining data processing systems. Such configurations might permit users to input data through one or more parts of the centralized configuration, and the data may then be shared with one or more of the remaining data processing systems within the centralized configuration.

However, the communications between data processing systems 100A-100N may be disrupted over time. When the communications are disrupted, the data processing systems may be unable to provide or may provide computer implemented services of lower quality than desired. When data processing systems may be unable to provide or provide computer implemented services of lower quality, the confidentiality, integrity, and/or availability of data used in the computer implemented services may be compromised. Confidentiality may relate to ensuring that authorized users with the proper credentials have access to data within data processing systems. Integrity may relate to ensuring that all data within data processing systems is accurate, and not subject to change without meeting specified requirements. Availability may relate to maintaining the data in a readily available state, and in a safely accessible state to authorized users and systems.

To reduce the likelihood of data processing systems providing lower quality computer implemented services, tools for data security may be utilized. For example, the tools for data security may include (i) access controls that limited access by a user or another system, (ii) data duplication, (iii) data erasure, (iv) data masking, (v) disaster recovery, (vi) data integrity, etc. Each of these tools is discussed below.

The access controls may include a mandatory login space for authorized personnel thereby allowing the authorized personnel to be authenticated. The authentication may ensure that access is given to a known user or system, a process that is facilitated by passwords, PIN numbers, or security tokens.

The data duplication tools may include storage of additional copies of data that may be subject to loss when the data processing system are compromised. In the event of system failure, data corruption or a breach, backup data copies may exist in different formats that are accessible within other data processing systems within deployment 100.

The data erasure methods may include disk reformatting, overwriting data with ones and zeros, degaussing, and physical destruction of the disk. Of the four data erasure methods, disk reformatting may not destroy the data, but instead may replace the existing file system with a new one. Similar but more targeted than disk formatting, overwriting data with ones and zeros may replace the data replaces the individual bits but may require multiple runs. A more structural approach than replacing data with zeros and ones is degaussing, which may involve disrupting the magnetic field of the electronic medium, thereby possibly destroying the data. Beyond disrupting the magnetic field of the electronic medium in which the data exists, physical destruction may involve the destruction of the physical medium that holds the data. Using any of the data erasure methods, data may become outdated or rendered unnecessary in time or through various transactions, authorized data erasure software and techniques may be required. Execution of authorized and proper data erasure ensures that the data may be unrecoverable and may no longer be accessible.

The data masking techniques may include data pseudonymization, data redaction, data shuffling, etc. Data pseudonymization may allow for swapping of data, perhaps names or e-mails, with a pseudonym or alias. Similar to data pseudonymization, data redaction may permit for swapping of data for generic values where not realistic values may exist. Perhaps more thorough than data swapping, data shuffling may permit scrambling of the data, so that the real values may remain but may be assigned to different characters. The data masking techniques may be forms of data obscuration in case that unauthorized users can gain access to the data.

The disaster recovery may include prevention, anticipation, and mitigation. Prevention may focus on constructing all data processing systems to be as reliable and secure as possible. Anticipation may focus on predicting future technology and natural disasters to identify disaster recovery solutions. Mitigation may focus on how to reduce the negative impact of a disaster on data processing systems.

The data integrity techniques may include data verification, data validation, and removal of data duplication. At the initial state of data integrity, input verification may require that new data be checked to ensure it falls within a range of acceptable values in data processing systems. In addition to data verification to ascertain whether input received is valid, Data validation may require that new data be checked to ensure it is accurate and consistent. In contrast to input verification and validation, data verification and validation may concern incoming data, data duplication may concern moving or outgoing data. As data may be moved through or output by data processing systems, removal of data duplication may ensure that unnecessary copies are not made to prevent it being seen from unauthorized users.

Thus, data resiliency within hardware and software present within data processing systems may safeguard the integrity of the data. The data security of the deployment may benefit with the encryption of transmitted messages between data processing systems and by users accessing the data processing systems so that an unauthorized user is unable to read messages in transmission through the deployment.

Even when secured using the data security tools, the communications between data processing systems may be disrupted, for example, due to malicious activity of a party. For example, the malicious party may perform one or more actions that may limit, corrupt, or otherwise reduce the ability of data processing systems to communicate with one another. To attempt to manage the malicious activity, various monitoring actions may be performed such as, for example, traffic analysis over network channels for any vulnerability scanning, port scanning, or monitoring for attempts at unauthorized access, and/or system-offensive actions taken by a malicious party, and various remediative actions may be performed to attempt to mitigate undesirable effects of the malicious activity on data processing systems while maintaining access for authorized users.

However, due to the scale, complexity, and/or other characteristics of deployment 100, the malicious party may utilize any number and type of mechanisms to disrupt data processing systems thereby rendering the monitoring and remediative actions to be less effective. Further, over time, the approach taken by the malicious to disrupt data processing systems may change. Accordingly, it may be challenging to identify and implement security models (e.g., combinations of monitoring and remediative actions) that successfully thwart the activities of malicious parties. Thus, the data security tools, discussed above, may be less effective at managing malicious activity.

Because data security tools may monitor key points within data processing systems for disruptions, the data security tools may be less effective. The effectiveness of the data security tools may concern the passive approach that they may take in safeguarding data processing systems.

For example, access controls may safeguard data processing systems at the entry points. At the entry points of data processing systems, an unauthorized user might attempt to hack into a data processing system.

Even if access controls may exist at the entry points of data processing systems, authentication may tighten the requirements for access at these entry points. Tightening the requirements for access may repel the malicious activity at the entry points. However, repulsion at the entry points may only restrict the malicious activity but may not do more to address the malicious activity itself. As more is not done to address the malicious activity at the access points, access controls are a passive means of dealing with malicious activity.

Perhaps just as passively as access controls and authentication, data erasure techniques may be preventative approaches to malicious activity to data security. Although perhaps preventative, data erasure techniques may require removal of hardware components from data processing systems and therefore may not permit a real-time response to the malicious activity.

Like data erasure techniques, data masking techniques may be passive approaches to data security that may not respond to malicious activity as it may take place. Instead of responding to malicious activity, data masking techniques may need to be implemented before malicious activity occurs to be effective in thwarting potential attacks by a malicious party.

Similar in approach to data masking techniques, data recovery techniques may require planning and creativity in anticipation to different types of malicious attacks. With the different types of malicious attacks that could befall data processing systems, developers of data processing systems may need to plan for malicious activity before potential attacks by a malicious party takes place. Consequently, data recovery techniques may not be implemented post occurrences of malicious attacks.

As data recovery techniques require developers of data processing systems to plan for malicious activity, data integrity techniques also require the same approach of developers through checking data that is input and output by data processing systems. In checking the data that is input and output from data processing systems, data integrity techniques expect a potential attack by a malicious party through use of incoming data or malicious use of data that is output by data processing systems. Expectation of a potential attack through use of input or output data may rely on the state of the data and any operations that may be performed on it. Reliance on the state of the data and any operations that may be performed on it may imply that the potential attack may have been completed and that prevention of malicious activity may no longer be possible. As prevention of malicious activity may no longer be possible, the damage by a potential attacker to data processing systems may already be done.

While data integrity techniques monitor for malicious activity in data that is input and output by data processing systems, data resiliency techniques may safeguard data while the data exists in data processing systems though encryption methods. By safeguarding data using encryption methods, potential attacks by a malicious party are expected to take place with the data. However, the extent to which encryption methods may safeguard data are limited by the types of attacks that are known to likely occur in the future. Consequently, if new malicious attack types are developed, encryption methods may provide reduced levels of protection.

In general, embodiments disclosed herein relate to systems and methods for improving the reliability of computer implemented services provided by deployment 100. To improve the reliability of the computer implemented services, the system of FIG. 1 may implement a framework for obtaining security models that are robust. To obtain security models that are robust, the framework may utilize inference models to identify potential attacks patterns that a malicious party, and security models that may be used to limit or prevent attacks implemented using the potential attack patterns. By doing so, the resulting security models may be more capable of preventing or limiting the impact of a wider range of attacks that a malicious party may make on deployment 100.

To implement the framework, the system of FIG. 1 may include deployment manager 102. Deployment manager 102 may include one or more security models and a digital twin. The digital twin may be a digital representation of data processing systems 100A-100N. The digital twin may mimic the architecture of, processes performed by, and qualities of data processing systems 100A-100N. For example, the processes may include input and output processes and responses, which may render the digital twin indistinguishable from the real-world counterpart (i.e., data processing systems 100A-100N in this example). Through use of the digital twin, deployment manager 102 may be able to simulate operation of real-world systems to monitor and/or analyze any process similar to the processes performed by data processing systems 100A-100N. In other words, the digital twin may respond in a manner similar if not the same as that of data processing systems 100A-100N.

The security models provided by deployment manager 102 may respond to malicious activity directed toward data processing systems 100A-100N. Due to the complexity of data processing systems 100A-100N (e.g., architecture, processes, etc.), there may be a near limitless number of possible error states, events, or other type of responses that may present thereby making identification and remediation of malicious activity more difficult. The security models may address this challenge through training and adaptation to the digital twin, which may be used to mimic all the possibilities of error states, events, or other type of responses that may be encountered in the real-world system. Security models, once trained, may decide how to respond to all of the possible error states and events, or other type of responses. To prepare security models to appropriately respond, deployment manager 102 may utilize reinforcement learning to train security models.

Reinforcement learning may include training an agent (e.g., a security model) in an environment to achieve a goal. For example, an interpreter may determine how well the agent had acted when exposed to a particular scenario of error states, events, or other type of responses. The security model selected by deployment manager 102 may include the agent and the environment may be the digital twin.

To perform the reinforced learning, a system-offensive action may be used to stimulate the digital twin to simulate some malicious activity, and the digital twin may respond with an error state, event, or other type of response. The security model may take system-remediative action to attempt to (i) identify that malicious activity has occurred and (ii) remediate the digital twin so to revert it to its original state and/or prevent error states, events, or other type of responses from occurring.

Under these conditions, the interpreter may decide whether actions performed based on the security model have indeed remediated the digital twin. If the interpreter decides that the security model took successful remediative action, then the security model is rewarded. However, if the interpreter decides that the security model took unsuccessful remediative action, whether the action had no effect or was itself offensive to the digital twin, then the security model is either not rewarded or even punished by deduction of previously accumulated rewards. This set of steps may be repeated until a number or epochs have elapsed, or another type of reward requirement has been met. In the learning process, whether to repeat an action in the environment (exploitation) or not (exploration) may be statistically determined or determined via other metrics/measurement tools.

After training the security model, deployment manager 102 may deploy the security model to data processing systems 100A-100N. Because the security model has been trained to adapt to the error states and events, or other type of responses of the data processing systems 100A-100N, the deployed security model may identify and remediate a broader range of malicious activity when compared to security models that are developed in different manners. Accordingly, when data processing systems 100A-100N experience system-offensive actions, the security model may take remediative action. The remediative action may render data processing systems 100A-100N to its previous state.

Any of data processing systems 100A-100N and/or deployment manager 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 101. In an embodiment, communication system 101 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Figure 2A:
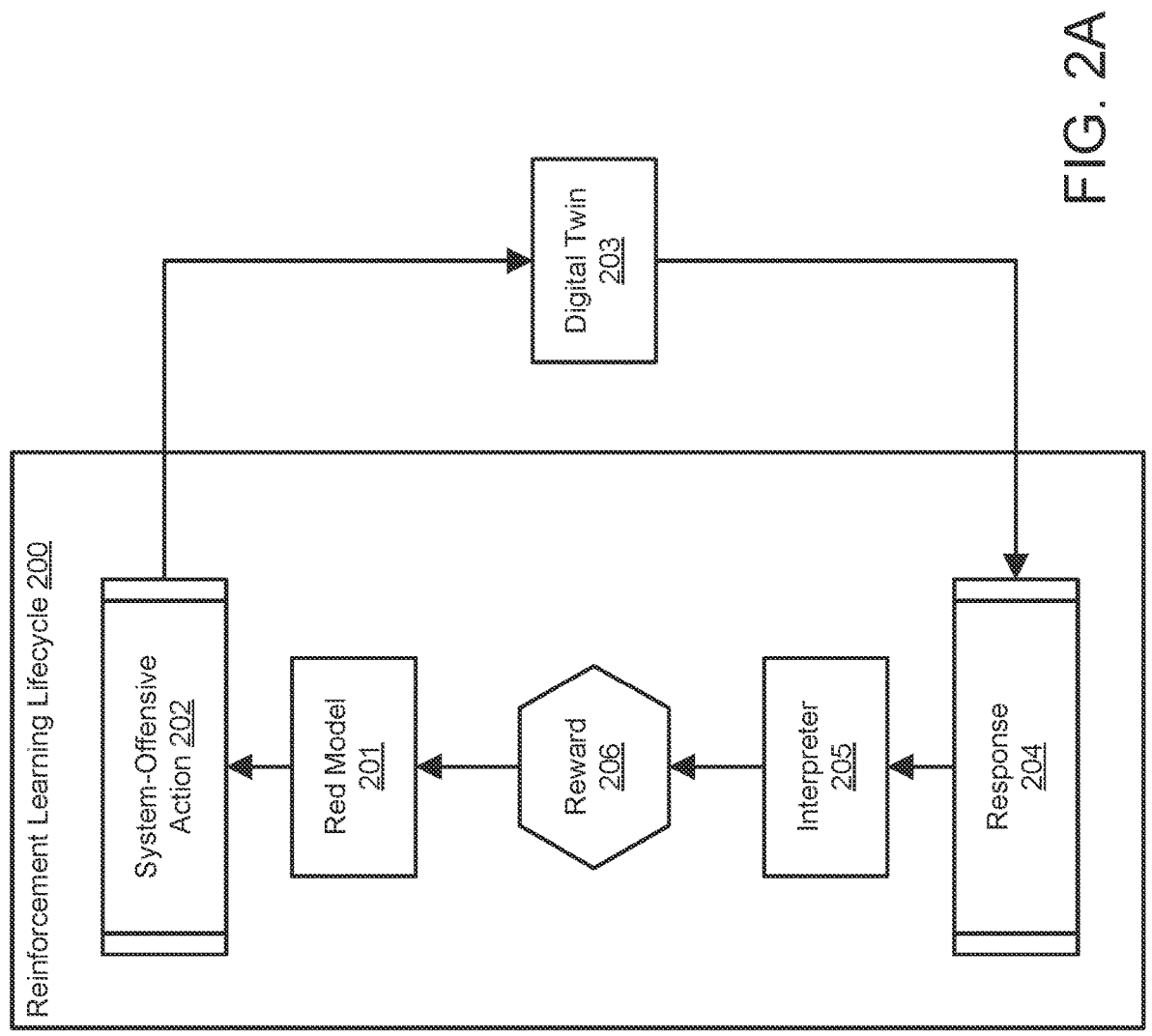
FIG. 2A shows a first data flow diagram illustrating operation of a portion of a system in accordance with an embodiment.
Figure 2B:
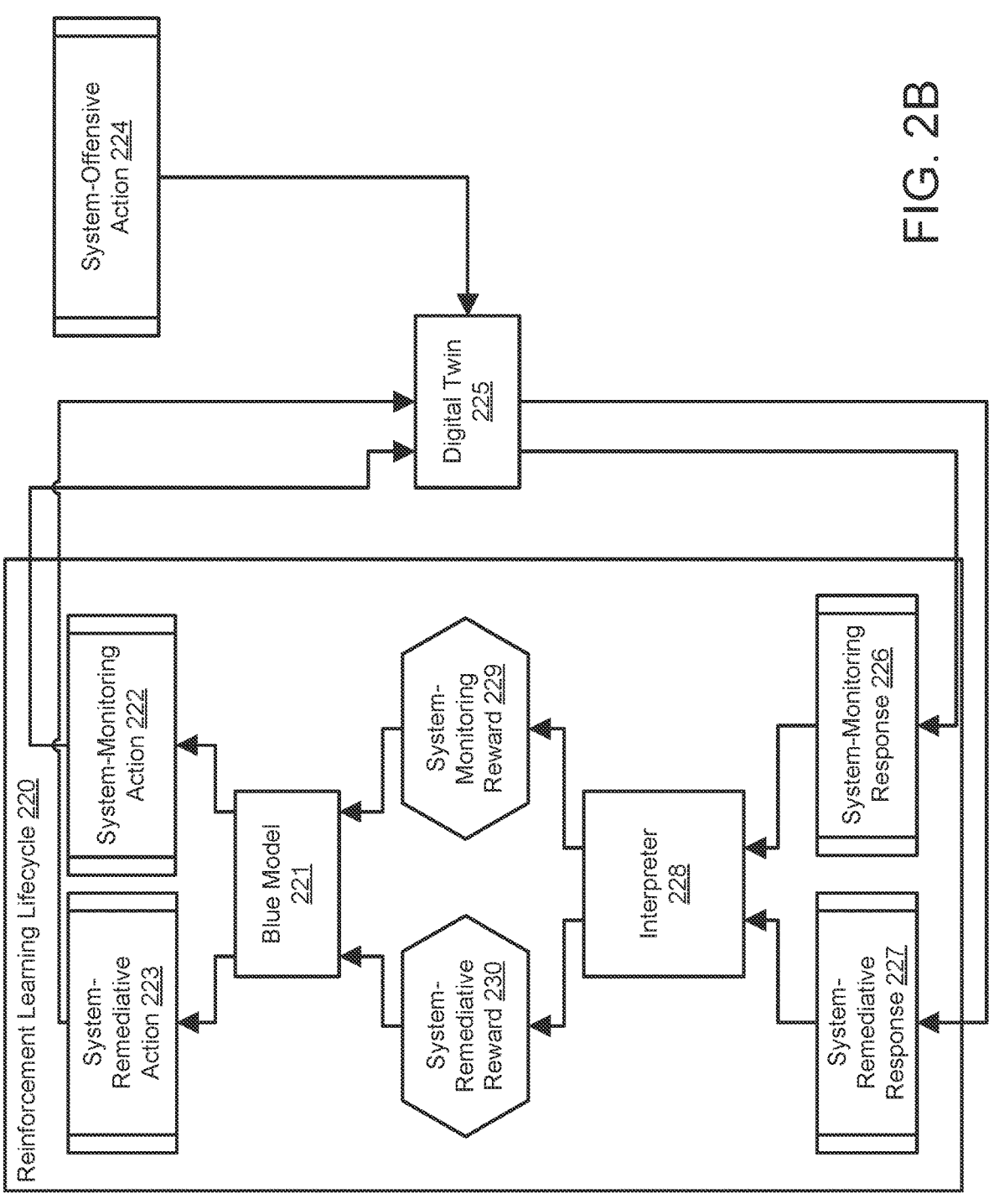
FIG. 2B shows a second data flow diagram illustrating operation of a portion of a system in accordance with an embodiment.
Figure 2C:
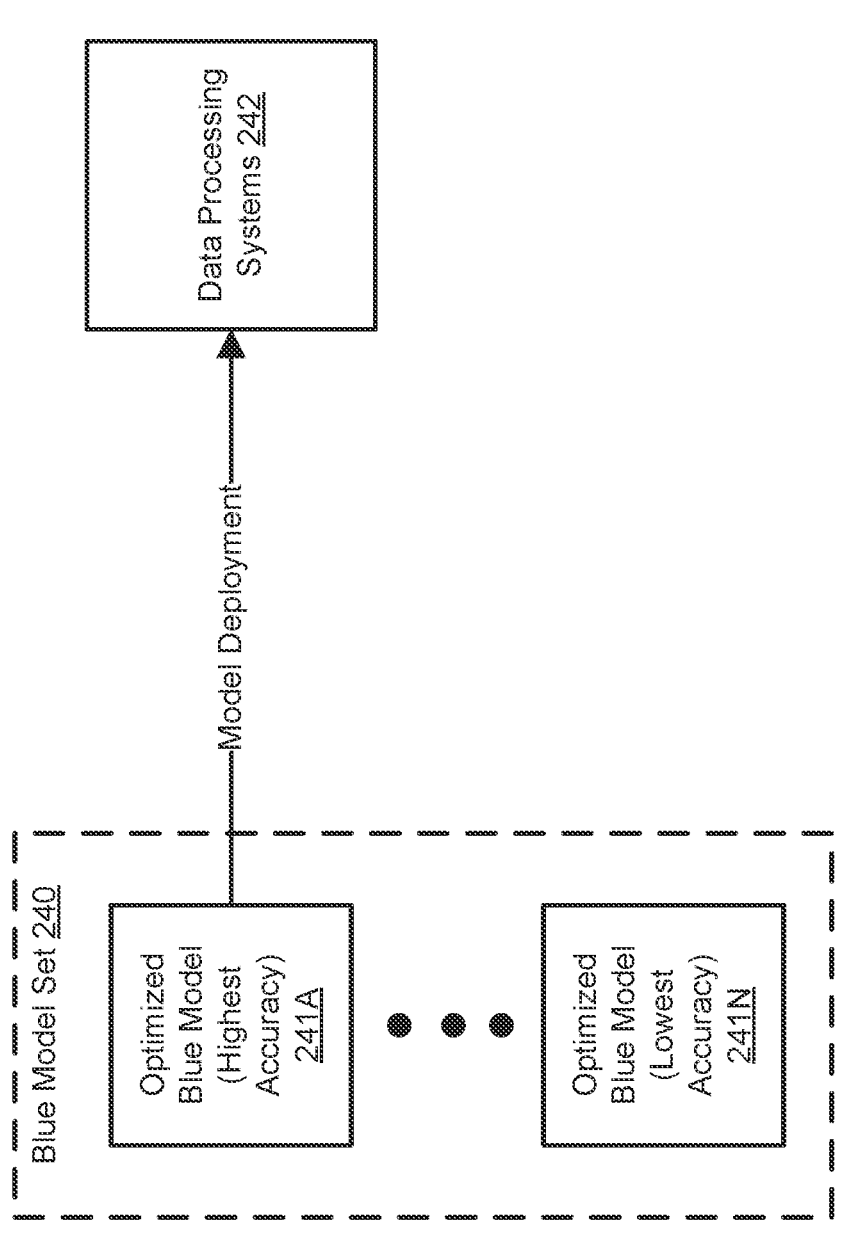
FIG. 2C shows a third data flow diagram illustrating operation of a portion of a system in accordance with an embodiment.

To further clarify embodiments disclosed herein, data flow diagrams are shown in FIG. 2A-2C. These data flow diagrams show flows of data that may be implemented by the system of FIG. 1. In FIG. 2A, reinforcement learning lifecycle 200 is illustrated. In FIG. 2B, reinforcement learning lifecycle 220 is illustrated. In FIG. 2C, a data flow diagram illustrating deployment of a security model from blue model set 240 to data processing systems 242 is shown.

Turning to FIG. 2A, a diagram illustrating reinforcement learning lifecycle 200 in accordance with an embodiment is shown. Reinforcement learning lifecycle 200 may be performed to train red model 201 to successfully implement system-offensive actions on digital twin 203. A successful system-offensive action may disrupt operation of digital twin 203. Through this process, a variety of different types of system-offensive actions that may disrupt the operation of a deployment 100 may be identified. Digital twin 203 may be a digital twin of deployment 100.

In reinforcement learning lifecycle 200, red model 201 may select system-offensive action 202. System offensive action 202 may be an action (and/or multiple actions) taken upon digital twin 203. As a result of system-offensive action 202, operation of digital twin 203 may be altered or digital twin 203 may produce one or more errors or exhibit one or more error states, or even be made more susceptible to further attacks. As evidence from being in an altered state or producing one or more errors of exhibiting one or more error states, digital twin 203 may run under the influence of system-offensive action 202. While under the influence of system-offensive action 202, digital twin 203 may be monitored for identification of response 204. The quality of response 204 may be one of all possibilities of error states, events, or other type of responses. Given the quality of response 204, interpreter 205 may analyze and determine if system-offensive action 202 may have been sufficient malicious activity to render Digital Twin 203 in a less stable or more compromised state.

As system-offensive action 202 may alter operation of digital twin 203 or cause errors, system-offensive action 202 may represent one or more forms of malicious activity. Forms of malicious activity that system-offensive action 202 may include Structured Query Language (SQL) injections, buffer overflows, synchronize (SYN) flood, privilege escalation, and/or other types of activity that may impact the operation of a system.

When SQL injections occur, query field of digital twin 203 may be exposed to SQL statements that are inputs for, for example, user entry or password. These SQL statements, in place of, for example, normal user or password inputs, may cause the addition, modification, and/or deletion of data, voiding of transactions, or spoofing of identities.

Through buffer overflows, digital twin 203 may experience large amounts of data being written to fixed-length blocks of memory, in order to access adjacent memory addresses.

With SYN floods, digital twin 203 may continuously sends numerous requests to connect to fake IP addresses but does not complete the connections, thereby possibly flooding all ports. Through privilege escalation attacks, digital twin 203 experiences exploitation of weaknesses and vulnerabilities through the elevation of access.

Responses of digital twin 203 to SQL injections may include insertions, updates, or deletion of data, execution or storing of SQL commands and administrative operations, or even changes in authentication and authorizations of one or more users. Responses of digital twin 203 to buffer overflow attacks may include of memory being overwritten, and new instructions appearing in code that exists in digital twin 203. Responses of digital twin 203 to SYN floods may include slow-downs or shut-downs of server connections, which may inhibit access of legitimate users to digital twin 203. Responses of digital twin 203 to privilege escalation may include changes to permissions once a user authentication has been hacked.

If interpreter 205 determines that the system-offensive action 202 was sufficient malicious activity to render digital twin 203 in a less stable or more compromised state, then Interpreter 205 gives reward 206, perhaps of measurable quantity, to red model 201. Conversely, if interpreter 205 determines that the system-offensive action 202 was not sufficient malicious activity to render digital twin 203 in a less stable or more compromised state, interpreter 205 may not give reward 206 to red model 201. In not giving reward 206 to red model 201, interpreter 205 may either take no action or remove reward that may have been given to red model 201 in previous training cycles as punishment for red model 201 taking an insufficient system-offensive action 202.

After the interpreter 205 has acted in response to the quality of the system-offensive action taken by red model 201, red model 201 may repeat the reinforcement learning lifecycle 200. In repeating the reinforcement learning lifecycle 200, red model 201 may either repeat the system-offensive action 202 that may have been committed in the previous training cycle or commit a system-offensive action 202 of different quality.

Red model 201 may be implemented using an inference model. An inference model may be implemented using a machine learning model, a decision tree, a naïve bayes model, a regression model, and/or a support vector machines model.

The machine learning model may be trained with a neural network. The neural network may be trained using supervised learning, unsupervised learning, semi-supervised learning, or reinforcement learning. The reinforcement learning process may require that red model 201 be the agent to train. The agent to train may learn how to implement system-offensive action 202 to disrupt or impede the operation of digital twin 203.

System-offensive action 202 may be implemented using one or more data structures that includes information regarding how to attack operation of digital twin 203. The data structures may include any type and quantity of information usable to describe how to attack the operation of digital twin 203. Further, the data structures may specify lists of action to be performed to attempt to attack the operation of digital twin 203.

For example, one of the items in the list of actions to be performed to impede the operation of digital twin 203 may be a SYN flood. As previously mentioned, a SYN flood is a denial-or-service attack that sends numerous synchronize requests to the target in order to slow down or impede operations by the target. In this example, the target is digital twin 203. When digital twin 203 experiences a SYN flood, the operation of digital twin 203 may simulate the effects of the SYN flood.

Digital twin 203 may be implemented using a one or more processes executing on a data processing system. The processes may simulate the operation of a deployment or other real world system. The processes may also include functionality to (i) ingest system-offensive action 202. When ingested, digital twin 203 may modify its operation based on the actions or other information specified by system-offensive action 202. For example, the resulting operation of digital twin 203 upon ingestion of system-offensive action 202 may simulate an attack on digital twin 203. Thus, through such simulations using various system-offensive actions, a variety of types of attack on a real-world system may be simulated.

Continuing with the previous example, digital twin may simulate an attack on it using system-offensive action 202. To do so, digital twin 203 may modify its operation based on the information included in system-offensive action 202. In the previous scenario, the SYN flood performed by system-offensive action 202 may have called for numerous synchronize requests to the target in order to slow down or impede operations of digital twin 203. When digital twin 203 experiences a SYN flood, the operation of digital twin 203 may simulate the effects of the SYN flood. The effects of the SYN flood with digital twin 203 may simulate a slow down or impediment of operations by digital twin 203. As a result in the slow down or impediment of operations by digital twin 203, normal operations of digital twin 203 may not proceed as they had before system-offensive action 202 and the response 204 may be a decreased rate of operations by digital twin 203.

Response 204 may be implemented using one of more data structures that include information on how digital twin 203 responds to system-offensive action 202. The information on how digital twin 203 responds may include results from simulations of system-offensive action 202. The results from simulations of system-offensive action 202 may include event messages, activity logs, or metadata.

Continuing with the previous example, response 204 may be given by digital twin 203 from the simulation of system-offensive action 202 by digital twin 203. System-offensive action 202 in the example is a SYN flood. A SYN flood may be simulated by digital twin 203. The result of the SYN flood simulated by digital twin 203 may be the slow down or impediment of normal operations by digital twin 203. The slow down or impediment of normal operations of digital twin 203 may be evident in response 204 given by digital twin 203. Response 204 may be of the form of event messages, activity logs, or metadata that is passed. However, the event message, activity logs, or metadata may be given at a slower rate than would normally be passed by digital twin 203. Further, the SYN flood may be evident from any of the event message, activity logs, or metadata passed by digital twin 203.

Interpreter 205 may be implemented using a process that may be able to read any event messages, activity logs, or metadata that may comprise response 204. The goal of reading response 204 may be to judge the effectiveness of system-offensive action 202 to modify, impede, or disrupt normal operations simulated by digital twin 203. In judging the effectiveness of system-offensive action 202 with digital twin 203, interpreter 205 qualifies the choice of system-offensive action 202 made by red model 201. In qualifying the choice of system-offensive action 202 made by red model 201, interpreter 205 may consider the capability of red model 201 to generate sufficiently effective malicious activity through selection of system-offensive model 202.

Continuing with the previous example, response 204 may be passed to interpreter 205. As response 204 may be passed to interpreter 205, the transfer of event messages, activity logs, and metadata may be passed at a rate more slowly than in normal operations because a SYN flood may impede or disrupt the transfer of said information by digital twin 203. When the transfer of messages, activity logs, and metadata by digital twin 203 to interpreter 205 has completed, interpreter 205 may be required to digest some or all of the information. In the digestion or some or all of the information by interpreter 205, it may be understood by digital twin 203 that all the network ports simulated by digital twin 203 were unavailable and may not have functioned normally. As digital twin reads that all the network ports simulated by digital twin 203 were unavailable and may not have functioned normally, interpreter 205 may judge system-offensive action 202, which was a SYN flood, to be effective malicious activity to disrupt and/or impede normal operations simulated by digital twin 203. In judging the SYN flood to be an effective malicious activity, interpreter 205 may consider that red model 201 selected effective malicious activity in choosing a SYN flood as system-offensive action 202. In considering that red model 201 selected effective malicious activity, interpreter 205 may transfer reward 206 to red model 201.

Reward 206 may be implemented using one or more data structures that may be transferred to red model 201 by interpreter 205 in response to effective malicious activity chosen as system-offensive action 202. If effective malicious activity is chosen by red model 201, reward 206 may be transferred to red model 201. Conversely, if ineffective malicious activity is chosen by red model 201, reward 206 may not be transferred to red model 201 or may be removed from red model 201. Through the transfer of reward 206, red model 201 may be taught that it chose system-offensive action 202 that is effective malicious activity that would disrupt and/or impede normal operations simulated by digital twin 203. In teaching red model 201 that it chose system-offensive action 202 that is effective malicious activity, red model 201 may learn that it chose system-offensive action 202 that is effective malicious activity to accumulate reward 206 in reinforcement learning lifecycles. In the accumulation of reward 206 in reinforcement learning life-cycles, a red model 201 may be trained that chooses system-offensive action 202 as effective malicious activity to disrupt and/or impede normal operations of digital twin 203.

Continuing with the previous example, interpreter 205 may transfer reward 206 to red model 201 for the selection of a SYN flood as system-offensive action 202. In gaining reward 206 for the selection of a SYN flood as system-offensive action 202, red model 201 learns that a SYN flood was effective malicious activity to select as system-offensive action 202. A SYN flood may have been effective malicious activity to select as system-offensive action 202 because interpreter 205 determined that a SYN flood was effective malicious activity. Interpreter 205 determined that a SYN flood was effective malicious activity because interpreter 205 may have digested the messages, activity logs, and metadata comprising response 204 and noted the effect of the SYN flood not only in response 204 but also in the slow transfer rate of response 204. Had not the SYN flood been determined by interpreter 205 to be effective malicious activity, interpreter 205 may not have transferred reward 206 to red model 201 or may have removed reward 206 from red model 201. As red model 201 has learned that a SYN flood was effective malicious activity to take upon digital twin 203, red model 201 may continue in reinforcement learning lifecycle 200. As it continues in reinforcement learning lifecycle 200, red model 201 may repeat the SYN flood as system-offensive action 202 (exploitation) or may choose a new form of malicious activity as system-offensive action 202 (exploration). With each system-offensive action 202 committed by red model 201 on digital twin 203 in rein-forcement learning lifecycle 200, red model 201 may accumulate reward 206 in the process of learning what malicious activity is effective to exact upon digital twin 203.

Thus, as shown in FIG. 2A, a system in accordance with an embodiment may identify any number and types of system-offensive actions. The system-offensive actions may be used to identify how to monitor for and remediate attacks on deployments. To do so, another reinforcement learning lifecycle may be performed.

Turning to FIG. 2B, a diagram illustrating reinforcement learning lifecycle 220 in accordance with an embodiment is shown. Reinforcement learning lifecycle 220 illustrates training of blue model 221 to implement system-monitoring actions and system-remediative actions on digital twin 225, which may be a digital twin of deployment 100

Reinforcement learning lifecycle 220 may begin with the expectation that a system-offensive action 224 may take place with digital twin 225. With the possibility of a poten-tial system-offensive action 224 upon digital twin 225, blue model 221 may initiate two actions: system-monitoring action 222 and system-remediative action 223. With system-monitoring action 222, blue model 221 may observe any change in system state of digital twin 225. With system-remediative action 223, blue model 221 may implement corrective procedures to reverse or correct any malicious activity that may have been done by system-offensive action 224.

System-offensive action 224 may be similar to system-offensive action 202 in FIG. 2A and their purpose may be to alter operation of digital twin 225 or cause errors. As both system-offensive action 224 and 202 may be similar, the examples of forms of malicious activity for system-offensive action 202 may extend as examples of system-offensive action 224. The source of system-offensive action 224 may be red model 201 and/or any processes or executable code.

Given digital twin 225 that has experienced system-offensive action 224, blue model 221 may initiate system-monitoring action 222. Examples of system-monitoring action 222 may include running system diagnostics, data-base health monitoring, network testing and troubleshoot-ing, and/or other types of actions that may be used to identify whether the operation of digital twin 225 is being influenced by any system offensive actions. Each of these examples is discussed below.

System diagnostics may include collection of information and reporting (based on the collected information) on the current state of a system. The reporting may include version numbers of the operating system and database, database statistics, server access logs, and/or include reports of other types of information regarding system operation.

Database health monitoring may include collection of performance metrics of data processing systems. Perfor-mance metrics for a database may include data ingestion rates, database size, and resource consumption.

Network testing and troubleshooting may include collec-tion of performance metrics between data processing sys-tems in a network to ensure adequate connectivity. Potential network problems may include high bandwidth usage, faulty hardware, high CPU utilization, poor physical connectivity, and/or other types of issues that may impact communica-tions.

In addition to system-monitoring action 222, blue model 221 may also initiate system-remediative action 223. Sys-tem-remediative action 223 may have a type or quality in response to system-offensive action 224 that may have taken place with digital twin 225. Given the examples of system-offensive action 224 previously cited, which include SQL injections, buffer overflows, SYN flood, and privilege esca-lation, system-remediative action 223 may be one of many responses to these or other types of system offensive actions. If system-offensive action 224 is a set of SQL injections, system-remediative action 223 may be to limit what char-acters may be input into an entry field to prevent the injected SQL code from being run or to deny execution of the injected SQL code. If system-offensive action 224 is a buffer overflow, system-remediative action 223 may be to stop certain running processes when the volume of data exceeds the storage capacity of the memory buffer. If system-offen-sive action 224 is a SYN flood, system-remediative action 223 may be to close all affected ports for a prescripted amount of time. If system-offensive action 224 is privilege escalation, system-remediative action 223 may be to restrict changes in privileges until authorization is given.

Having attempted to observe any changes in the system state of digital twin 225 due to system-offensive action 224 and to implement corrective procedure on digital twin 225 to reduce the impact of system-offensive action 224, digital twin 225 may provide system-monitoring response 226 and system-remediative response 227. With system-monitoring response 226, digital twin 225 may log previous, current, and/or new system conditions. System-monitoring response 226 may be used to identify whether system-offensive action 224 was identified through implementation of system-moni-toring action 222. With system-remediative response 227, digital twin 225 may log information reflecting the operation of digital twin while system-offensive action 224 and sys-tem-remediative action 223 are implemented. System-remediative response 227 may be used to identify whether system-remediative action 223 mitigated the impact of system-offensive action 224.

Using system-remediate response 227 and system-monitoring response 226, interpreter 228 may decide if blue model 221 implemented an accurate system-monitoring action and/or an effective system-remediative action 223 in response to system-offensive action 224.

Interpreter 228 may decide that blue model 221 may have implemented system-monitoring action 222 that may have correctly observed state conditions of digital twin 225, then interpreter 228 may give system-monitoring reward 229 to blue model 221. Conversely, if interpreter 228 decides that blue model 221 implemented system-monitoring action 222 that may have not correctly observed state conditions of digital twin 225, then interpreter 228 may not give system-monitoring reward 229 to blue model 221. In interpreter 228 not giving system-monitoring reward 229 to blue model 221, interpreter 228 may further judge the quality of system-monitoring response 226 and may give no system-monitoring reward 229 may remove system-monitoring reward 229 that was given to blue model 221 in previous training cycles as punishment, or may give a negative value for system-monitoring reward 229 to blue model 221 also as punishment. If interpreter 228 decides that blue model 221 may have implemented system-remediative action 223 that may have corrected any malicious activity done by system-offensive action 224 of digital twin 225, then interpreter 228 may give system-remediative reward 230 to blue model 221. Conversely, if interpreter 228 decides that blue model 221 implemented system-remediative action 223 that may not have corrected any malicious activity done by system-offensive action 224 of digital twin 225, then interpreter 228 may not give system-remediative reward 230 to blue model 221. In interpreter 228 not giving system-remediative reward 230 to blue model 221, interpreter 228 may further judge the quality of system-remediative response 227 and may give no system-remediative reward 230 or perhaps remove system-remediative reward 230 that was given to blue model 221 in previous training cycles as punishment.

After interpreter 228 may have acted in response to system-monitoring action 222 and system-remediative action 223 taken by blue model 221, blue model 221 may repeat reinforcement learning lifecycle 220. In repeating reinforcement learning lifecycle 220, blue model 221 may either repeat system-monitoring action 222 and system-remediative action 223 that may have been committed in the previous training cycle or commit different actions for one or the other or both system-monitoring action 222 and/or system-remediative action 223.

Blue model 221 may be implemented using an inference model. An inference model may be implemented, for example, using a machine learning model, a decision tree, a naïve bayes model, a regression model, and/or a support vector machines model.

The machine learning model may be trained with a neural network. The neural network may be trained using supervised learning, unsupervised learning, semi-supervised learning, reinforcement learning, and/or other types of training processes. The reinforcement learning process may require that blue model 221 be the agent to train. The agent to train may learn how to implement system-monitoring action 222 to monitor the operation of digital twin 225. The agent to train may also learn how to implement system-remediative action 223 to correct or alleviate any disruptions or impediments to the normal operation of digital twin 225 by system-offensive action 224.

System-offensive action 224 may be implemented using one or more data structures that includes information regarding how to attack operation of digital twin 225. The data structures may include any type and quantity of information usable to describe how to attack the operation of digital twin 225. Further, the data structures may specify lists of action to be performed to attempt to attack the operation of digital twin 225.

For example, one of the items in the list of actions to be performed to impede the operation of digital twin 225 may be SQL injections. As previously mentioned, SQL injections occurs when SQL code is written and executed in query fields where, for example, user name and passwords may be appropriate to input. In this example, the target is digital twin 225. When digital twin 225 experiences SQL injections, the operation of digital twin 225 may simulate the effects of SQL injections.

Digital twin 225 may be implemented using a one or more processes executing on a data processing system. The processes may simulate the operation of a deployment or other real-world system. The processes may also include functionality to ingest system-offensive action 224. When ingested, digital twin 225 may modify its operation based on the actions or other information specified by system-offensive action 224. For example, the resulting operation of digital twin 225 upon ingestion of system-offensive action 224 may simulate an attack on digital twin 225. Thus, through such simulations using various system-offensive actions, a variety of types of attack on a real-world system may be simulated.

Continuing with the previous example, digital twin 225 may simulate an attack on it using system-offensive action 224. To do so, digital twin 225 may modify its operation based on the information included in system-offensive action 224. SQL injections performed by system-offensive action 224 may have called for the deletion of data within digital twin 225. When digital twin 225 experiences SQL injections, the operation of digital twin 225 may simulate the effects of SQL injections. The effects of SQL injections with digital twin 225 may simulate deletion of data within digital twin 225. As a result of the deletion of data within digital twin 225, normal operations of digital twin 225 may not proceed as they had before system-offensive action 224. In this example, the operations that may be simulated in digital twin 225 because of the deletion of data caused by system-offensive action 224 may include missing fields within databases, executed code that may not run properly, or perhaps network communication issues.

System-monitoring action 222 may be implemented using one or more data structures that includes information regarding how to monitor operations of digital twin 225. The data structures may include any type and quantity of information usable to describe how to monitor operations of digital twin 225. Further, the data structures may specify lists of action to be performed to attempt to monitor operations of digital twin 225

Continuing with the previous example, digital twin 225 may have experienced system-offensive action 224 which may have disrupted or impeded normal operations of digital twin 225. As a result of disrupting or impeding normal operations of digital twin 225, blue model 221 may attempt to monitor the operations of digital twin 225. To monitor the operations of digital twin 225, blue model 221 may initiate system-monitoring action 222. In initiating system-monitoring action 222, blue model 221 may attempt to run diagnostics, perform verification or validation tests, check network communication capabilities, or run database query tests on digital twin 225. Alongside implementing system-monitoring action 222, blue model 221 may implement system-remediative action 223.

System-remediative action 223 may be implemented using one or more data structures that includes information regarding how to rectify any disrupted or impeded operations of digital twin 225. The data structures may include any type and quantity of information usable to describe how to rectify any disrupted or impeded operations of digital twin 225. Further, the data structures may specify lists of action to be performed to attempt to rectify operations of digital twin 225.

Continuing with the previous example, blue model 221 may have implemented system-monitoring action 222 to monitor the operations of digital twin 225. Alongside implementing system-monitoring action 222, blue model 221 may have also implemented system-remediative action 223. In implementing system-remediative action 223, blue model 221 may be exploiting or exploring in response to disrupted or impeded operations of digital twin 225 from a previous training cycle in reinforcement learning lifecycle 220 or may be exploiting or exploring likely disrupted or impeded operations of digital twin 225. If blue model 221 knows from previous training cycles that digital twin 225 experienced SQL injections, it may initiate system-remediative action 223 that may include running input validation, altering database queries that may include SQL injections, and/or stopping some or all operations. After initiating system-monitoring action 222 and system-remediative action 223, digital twin 225 may give system-monitoring response 226.

System-monitoring response 226 may be implemented using one of more data structures that include information on how digital twin 225 responds to system-monitoring action 222. The information on how digital twin 225 responds may include results from simulations of system-monitoring action 222 and system-remediative action 223. The results from simulations of system-monitoring action 222 may include, for example, event messages, activity logs, metadata, and/or other types of information reflecting the operation of digital twin 225.

Continuing with the previous example, digital twin 225 may give system-monitoring response 226. In giving system-monitoring response 226, digital twin 225 may be responding to the system-monitoring action 222 and system-remediative action 223 taken by blue model 221. Blue model 221 may have taken system-monitoring action 222 and system-remediative action 223 not only in response to monitor the current operations of digital twin 225 but may also be taken to remediate disrupted or impeded operations caused by SQL injections, respectively. After monitoring or remediating operations of digital twin 225, digital twin 225 may respond with system-monitoring response 226 to report new diagnostics, including the current state of the system, database statistics, server access logs, etc. The reports from system-monitoring response 226 may confirm that system-monitoring action 222 discovered the effects of system-offensive action 224. Alongside discovery of the effects stemming from system-offensive action 224, digital twin 225 may also respond with system-remediative response 227 to confirm the effects of system-remediative action 223 to counter disrupted or impeded operations of digital twin 225 by system-offensive action 224.

System-remediative response 227 may be implemented using one of more data structures that include information on how digital twin 225 responds to system-remediative action 223. The information on how digital twin 225 responds may include results from simulations of system-monitoring action 222 and system-remediative action 223. The results from simulations of system-remediative response 227 may include event messages, activity logs, metadata specific to operations that were disrupted or impeded by system-offensive action 224, and/or other types of information usable to diagnose whether the impacts of system-offensive action 224 were remediated by system-remediative action 223.

Continuing with the previous example, digital twin 225 may give system-remediative response 227. In giving system-remediative response 227, digital twin 225 may be responding to system-remediative action 223 taken by blue model 221. Blue model 221 may have taken system-remediative action 223 to remediate disrupted or impeded operations caused by SQL injections. After remediating operations of digital twin 225, digital twin 225 may respond with reports concerning the new state of operations that were disrupted by SQL injections. Reports concerning the new state of operations that were disrupted by SQL injections may include not only the input locations where SQL injections may have taken places, what the SQL strings were, if SQL injections were caught before execution by system-remediative action 223, memory locations that may have been vulnerable by SQL injections, etc. Reports included in system-remediative response 227 and system-monitoring response 226 may then be given to interpreter 228.

Interpreter 228 may be implemented using a process that may be able to read any reports, event messages, activity logs, or metadata that may comprise system-monitoring response 226 and system-remediative response 227. The goal of interpreter 228 may be to judge the effectiveness of system-monitoring action 222 and system-remediative action 223. In judging the effectiveness of system-monitoring action 222 226, interpreter 228 qualifies the choice made by blue model 221 in implementing system-monitoring action 222. In qualifying the choice made by blue model 221 in implementing system-monitoring action 222, interpreter 228 may consider the capability of blue model 221 to accurately monitor the operations of digital twin 225. Likewise, in judging the effectiveness of system-remediative response 227, interpreter 228 may qualify the choice made by blue model 221 in implementing system-remediative action 223. In qualifying the choice of system-remediative response 227 made by blue model 221 in implementing system-remediative action 223, interpreter 228 may consider the capability of blue model 221 to accurately rectify disrupted or impeded operations in digital twin 225 caused by system-offensive action 224.

Continuing with the previous example, digital twin 225 may give system-monitoring response 226 and system-remediative response 227 to interpreter 228. In receiving system-monitoring response 226 and system-remediative response 227, interpreter 228 may qualify the responses. To qualify system-monitoring response 226, interpreter 228 may ascertain how complete the diagnostics are, if verification or validation were run and meet standards, ensure network communication capabilities were checked and established, and/or any database query tests were successfully run and passed. Likewise, to qualify system-remediative response 227, interpreter 228 may check reports or diagnostics specifically concerning SQL injections which system-remediative action 223 attempted to rectify. In checking reports or diagnostics concerning SQL injections, interpreter 228 may determine if system-remediative action 223 was sufficient in removing the disruption or impediment caused by system-offensive action 224. Regarding the quality of system-monitoring response 226, interpreter 228 may give system-monitoring reward 229 to blue model 221. Likewise, regarding the quality of system-remediative response 227, blue model 221 may receive system-remediative reward 230 from interpreter 228.

System-monitoring reward 229 may be implemented using one or more data structures that may be transferred to blue model 221. In giving system-monitoring reward 229 to blue model 221, interpreter 228 responds to the quality of blue model 221 to monitor digital twin 225 through system-monitoring action 222. Interpreter 228 may reward blue model 221 if interpreter 228 finds that system-monitoring response 226 from digital twin 225 confirms system-monitoring action 222 taken by blue model 221. In system-monitoring response 226 confirming system-monitoring action 222, the response confirms the capability of blue model to accurately and efficiently run diagnostics on digital twin 225, including diagnostics concerning any disruption or impediment in operations by system-offensive action 224. In confirming the capability of blue model 221 to run diagnostics on digital twin 225, blue model 221 may be confirmed to have the capability to monitor digital twin 225. In confirming the capability to monitor digital twin 225, blue model 221 may receive system-monitoring reward 229 from interpreter 228.

Continuing with the previous example, blue model 221 may receive system-monitoring reward 229 from interpreter 228. In gaining the reward from interpreter 228, blue model 221 may learn that it may have accurately and efficiently run diagnostics on digital twin 225 by system-monitoring action 222, including those concerning any disruption or impediment in operations by system-offensive action 224. Concerning any disruption or impediment in operations, SQL injections may have been run in digital twin 225. As SQL injections may have been run in digital twin 225, system-monitoring action 222 may have been able to identify the presence of SQL injections. As system-monitoring action 222 may have accurately run diagnostics and been able to identify the presence of SQL injections, system-monitoring response 226 have confirmed successful diagnostic runs and identification of SQL injections. As system-monitoring response 226 have confirmed successful diagnostic runs and identification of SQL injections in digital twin 225, blue model 221 may have consequently received system-monitoring reward 229 from interpreter 228. After receiving system-monitoring reward 229 from interpreter 228, reinforcement learning lifecycle 220 may continue towards the continued accumulation of system-monitoring reward 229.

System-remediative reward 230 may be implemented using one or more data structures that may be transferred to blue model 221. In giving system-remediative reward 230 to blue model 221, interpreter 228 may respond to the quality of blue model 221 to rectify the disrupted or impeded operations of digital twin 225 by system-offensive action 224. In responding to the quality of blue model 221 to rectify the disrupted or impeded operations of digital twin 225 by system-offensive action 224, interpreter 228 may digest system-remediative response 227 to determine if system-remediative action 223 was sufficient to counter or alleviate disruptions or impediments to operations in digital twin 225. If system-remediative action 223 was sufficient to counter or alleviate disruptions or impediments to operations in digital twin 225, then blue model 221 may receive system-remediative reward 230 from interpreter 228.

Continuing with the previous example, blue model 221 may receive system-remediative reward 230 from interpreter 228. In gaining the reward from interpreter 228, blue model 221 may learn that it may have taken sufficient action with system-remediative action 223 to counter or alleviate disruptions or impediments to operations in digital twin 225. In learning that it may have taken sufficient action with system-remediative action 223, blue model 221 may have learned how to counter or alleviate the effects of SQL injections being simulated within digital twin 225. In learning how to counter or alleviate the effects of SQL injections being simulated within digital twin 225, system-remediative action 223 may have included running input validation, altering database queries that may include SQL injections, and/or stopping some or all operations. As system-remediative action 223 may have included one or more of these action, system-remediative response 227 may relay the successful outcome of system-remediative action 223 to interpreter 228. In being relayed the successful outcome of system-remediative action 223, blue model 221 may receive system-remediative reward 230 from interpreter 228. After receiving system-remediative reward 230 from interpreter 228, reinforcement learning lifecycle 220 may continue towards the continued accumulation of system-remediative reward 230.

Continuing towards the accumulation of system-monitoring reward 229 and system-remediative reward 230, the optimization of system-monitoring action 222 and system-remediative action 223 may continue. As the optimization of system-monitoring action 222 and system-remediative action 223 may continue, optimized blue model may be generated. As optimized blue models may be generated, a set of optimized blue models may be generated. With a set of optimized blue models that may have been generated, the blue models may then be deployed to secure deployments.

Turning to FIG. 2C, a diagram illustrating the deployment of an optimized blue model from blue model set 240 to data processing system 242 in accordance with an embodiment is shown. An optimized blue model may originate from optimized blue model 214A-241N, which may include blue models optimized to varying performance criteria. From the blue models optimized to varying performance criteria, the blue model that may meet the highest accuracy or desired performance may be selected for model deployment to data processing system 242.

As an example, blue model set 240 may pertain to blue models optimized for network performance between data processing systems within a deployment. As the blue model set may have been optimized for network performance, the performance between blue model 214A-241N may vary depending on their ability to detecting and remediate the effects of, for example, SYN floods. The variation in performance may depend on how each blue model was trained and rewarded within their reinforcement learning lifecycles. The better trained and more rewarded the blue model was, the better performance that the blue model may have demonstrated in monitoring and remediating network performance issues.

Upon selection and model deployment of an optimized blue model for data processing system 242, the optimized blue model may be selected to monitor and remediate any system-offensive actions that may be received by data processing systems 242. In monitoring and remediating any system-offensive actions that may be received by data processing systems 242, the deployed optimized blue model may utilize training from its reinforcement learning lifecycle and may respond to data processing system 242 as it may have responded to the digital twin with which it may have been trained.

Continuing from the previous example, blue model 241A may have been selected from blue model set 240 to monitor and remediate network performance issues. As blue model 241A was selected to monitor and remediate network performance issues, blue model 241A may have earned the highest reward among blue model 214A-241N. In earning the highest reward among blue model 214A-241N, blue model 241A may have demonstrated the highest accuracy, or lowest error rate, in monitoring and remediating network performance issues.

Blue model set 240 may be a collection of optimized blue model 241A-241N security models. The collection of optimized blue model 241A-241N security models may include blue models optimized to varying performance criteria. Blue model 241A-241N may be implemented using inference models. An inference model may be implemented using a machine learning model, a decision tree, a naïve bayes model, a regression model, and/or a support vector machines model.

The machine learning model may be trained with a neural network. The neural network may be trained using supervised learning, unsupervised learning, semi-supervised learning, or reinforcement learning. The reinforcement learning process may require that blue model 241A-241N be the agents to train. Each agent to train may learn how to implement system-monitoring action 222 to monitor the operation of digital twin 225 from FIG. 2B. As well, the agent to train may also learn how to implement system-remediative action 223 to correct or alleviate any disruptions or impediments to the normal operation of digital twin 203 by system-offensive action 224 from FIG. 2B.

In training to monitor operations and correct or alleviate any disruptions or impediments to the normal operation of digital twin 203, blue model 241A-241N may each demonstrate variations in performance and earned rewards. As each may demonstrate variations in performance and earned rewards, blue model 241A-241N may be ranked by performance criteria and accuracy from earned rewards according to blue model set 240.

Continuing with the previous example, blue model set 240 may comprise a set of blue model 241A-241N security models optimized to detect and remediate network performance issues. Having been trained to detect and remediate network performance issues, blue model 241A-241N may have demonstrated variations in performance and accuracy in monitoring network performance issues. Some of blue model 241A-241N may have been able to detect network performance issues, including SYN floods, but not able to remediate them sufficiently. Where some of blue model 241A-241N may have only been able to detect network performance issue, some of blue model 241A-241N may have been able to detect and remediate network performance issues, thus demonstrating the better performance. While some of blue model 241A-241N may have been able to detect and remediate network performance issues, some of blue model 241A-241N may not have been able to identify network activities at all, thus completely unable to detect and remediate network performance issues. These variations in performance for detection and remediation of network performance may exist within blue model 241A-241N.

Data processing systems 242 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Continuing with the previous example, blue model 241A may be deployed to data processing systems 242. Having been deployed to data processing systems 242, blue model 241A may have demonstrated the best performance in monitoring and remediating network performance issues. In demonstrating best performance with network performance issues, blue model 241A may be a suitable candidate to monitoring and remediating network performance issues for data processing systems 242. In monitoring and remediating network performance issues for data processing systems 242, blue model 241A may be responsible for monitoring and remediating network performance issues, such as SYN floods, which slow down or impede network activities on data processing systems 242. When the network performance slows down or becomes impeded on data processing systems 242, blue model 241A may respond in real-time by, for example, blocking malicious traffic, enacting firewalls that can filter illegitimate SYN packets, or changing the number of SYN packets that can be received at one time. In responding with solutions to network performance issues to data processing system 242, blue model 241A demonstrates the capability to monitor and remediate network performance issues as it was trained with digital twin 225 in FIG. 2B.

Figure 3A:
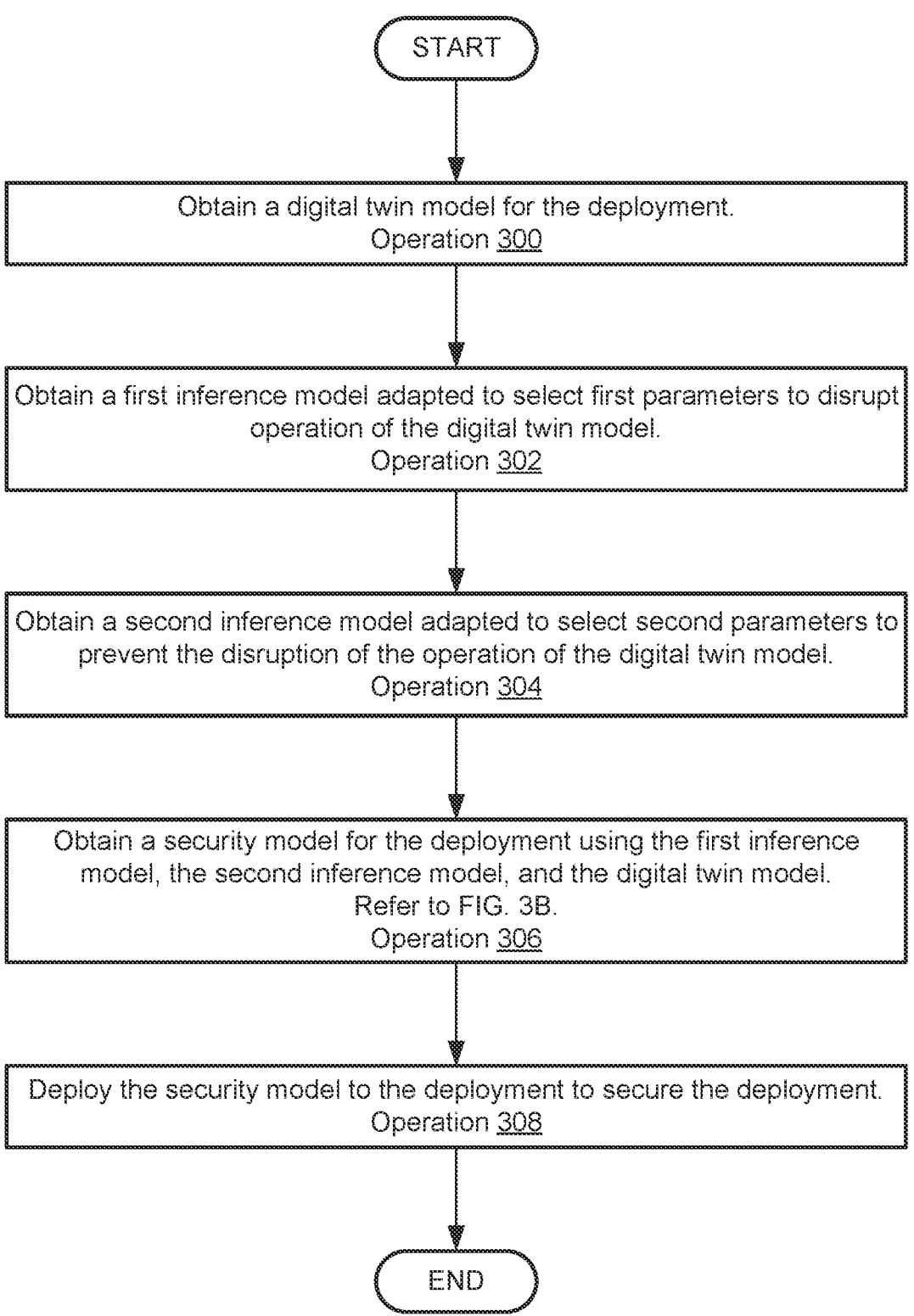

As discussed above, the components of FIG. 1 may perform various methods to perform anomaly detection in a distributed environment in which devices may be subject to malicious attacks. FIGS. 3A-3C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of anomaly detection using an inference model in accordance with an embodiment is shown. The method may be performed, for example, by an anomaly detector, a data collector, and/or another device.

At operation 300, a digital twin model for a deployment may be obtained. The digital twin model may be obtained by (i) reading the digital twin model from storage, (ii) obtaining the digital twin model from another device, (iii) generating the digital twin model, and/or via other methods.

The digital twin model may be read from storage by locating the digital twin in storage, ensuring access rights to the digital twin and adequate space exists on the local disk for the digital twin, and copying the digital twin to the local drive.

The digital twin model may be obtained from another device by ensuring access rights to digital twin on the other device and copying the digital twin to the local device.

At operation 302, a first inference model adapted to select first parameters to disrupt operation of the digital twin model is obtained. The first inference model may be obtained by (i) reading the first inference model from storage, (ii) obtaining the first inference model from another device, (iii) generating the first inference model, and/or via other methods.

The first inference model may be generated by (i) identifying a type of inference model to select the first parameters, and (ii) generating an instance of the type of the inference model.

The type of the first inference model may be identified by (i) identifying a first set of manipulable operations of the digital twin model; (ii) identifying first operating metrics of the digital twin model that are monitorable; and (iii) using the first set of manipulable operations the first operating metrics to discriminate the type of the inference model from other types of inference models. The first set of manipulable operation of the digital twin model may be identified by (i) reading the first set of manipulable operation from storage, (ii) obtaining user input indicating the first set of manipulable operations, and/or via other methods. The first operating metrics of the digital twin model that are monitorable may be identified by (i) reading the first operating metrics from storage, (ii) obtaining user input indicating the first operating metrics, and/or via other methods. The first set of manipulable operations and the first operating metrics may be used to discriminate the type of the inference model from other types of inference models by identifying which of the first set of manipulable operations or combinations thereof yields variations in the first operating metrics or combinations thereof, thereby noting the relationships between the first set of manipulable operations and the first operating metrics.

The instance of the type of the inference model may be generated by varying the first set of manipulable operations or combinations thereof until the first operating metrics yield metrics that note optimal or preferred performance criteria.

At operation 304, a second inference model adapted to select second parameters to prevent the disruption of operation of the digital twin model is obtained. The second inference model may be obtained by (i) reading the second inference model from storage, (ii) obtaining the second inference model from another device, (iii) generating the second inference model, and/or via other methods.

The second inference model may be generated by (i) identifying a type of inference model to select the second parameters, and (ii) generating an instance of the type of the inference model.

The type of the second inference model may be identified by (i) identifying a second set of manipulable operations of the digital twin model; (ii) identifying second operating metrics of the digital twin model that are monitorable; and (iii) using the second set of manipulable operations the first operating metrics to discriminate the type of the inference model from other types of inference models. The second set of manipulable operation of the digital twin model may be identified by (i) reading the second set of manipulable operation from storage, (ii) obtaining user input indicating the second set of manipulable operations, and/or via other methods. The second operating metrics of the digital twin model that are monitorable may be identified by (i) reading the second operating metrics from storage, (ii) obtaining user input indicating the second operating metrics, and/or via other methods. The second set of manipulable operations and the second operating metrics may be used to discriminate the type of the inference model from other types of inference models by identifying which of the second set of manipulable operations or combinations thereof yields variations in the first operating metrics or combinations thereof, thereby noting the relationships between the second set of manipulable operations and the second operating metrics.

At operation 306, a security model for the deployment is obtained using the first inference model, the second inference model, and the digital twin. The security model may be obtained by (i) reading the security model from storage, (ii) obtaining the security model from another device, (iii) generating the security model, and/or via other methods. The security model may be generated using the method shown in FIG. 3B. The security model may be obtained using other methods without departing from embodiments disclosed herein.

At operation 308, a security model obtained using the first inference model, second inference model, and the digital twin model may be deployed. The security model may be deployed by selecting the best performing security model from a set of optimized security models and transferring the security model to the deployment The method may end following operation 308.

Turning to FIG. 3B, a flow diagram illustrating a method of obtaining a security model in accordance with an embodiment is shown. The method may be performed, for example, by an anomaly detector, a data collector, and/or another device.

At operation 310, iterative computations are performed with the first and second inference models to obtain a set of security models. Performing iterative computations with the first and second inference models to obtain a set of security models may include (i) running training cycles with the first inference model with the digital twin, (ii) running training cycles with the second inference model with the digital twin, and (iii) producing a security model optimized for performance through the training cycles with the first inference model and second inference model.

Running training cycles with the first inference model with the digital twin may include (i) selecting the first parameters, (ii) running the first inference model using the first parameters, (iii) obtaining operating metrics from the first inference model using the first parameters, and (iv) using the operating metrics to update operation of the first inference model to select a new set of first parameters. The first parameters may be selected by initializing the first inference model with a random or known set of first parameters. The first inference model using the first parameters may be run by training the first inference model to disrupt or impede operations of the digital twin. Operating metrics from the first inference model using the first parameters are obtained by interpreting responses of the digital twin based on actions made by the first inference model. Operating metrics to update operation of the first inference model to select a new set of first parameters are used by interpreting the responses of the digital twin to determine whether actions done by the first inference model may have disrupted or impeded operations of the digital twin.

Running training cycles with the second inference model with the digital twin may include (i) selecting the second parameters, (ii) running the second inference model using the second parameters, (iii) obtaining operating metrics from the second inference model using the second parameters, and (iv) using the operating metrics to update operation of the second inference model to select a new set of second parameters. The second parameters may be selected by initializing the second inference model with a random or known set of second parameters. The second inference model using the second parameters may be run by training the second inference model to correct for disrupted or impeded operations of the digital twin. Operating metrics from the second inference model using the second parameters are obtained by interpreting responses of the digital twin based on actions made by the second inference model. Operating metrics to update operation of the second inference model to select a new set of second parameters are used by interpreting the responses of the digital twin to determine whether actions done by the second inference model may have corrected for disrupted or impeded operations of the digital twin.

At operation 312, the security models are ranked based on performance criteria. Ranking the security models based on performance may include arranging a list of security models based how accurately and consistently the second inference model may correct for disrupted or impeded operations of the digital twin based how well the first inference model may have disrupted or impeded operations of the digital twin.

At operation 314, the security model is selected for deployment based on the rank ordering. Selection of the security model for deployment based on rank ordering may include acquisition of the security model from the list of security models ranked according to accurate and consistent performance of the second inference model based on the performance of the first inference model and commission for use of the security model for deployment.

The method may end following operation 314.

Figure 4:
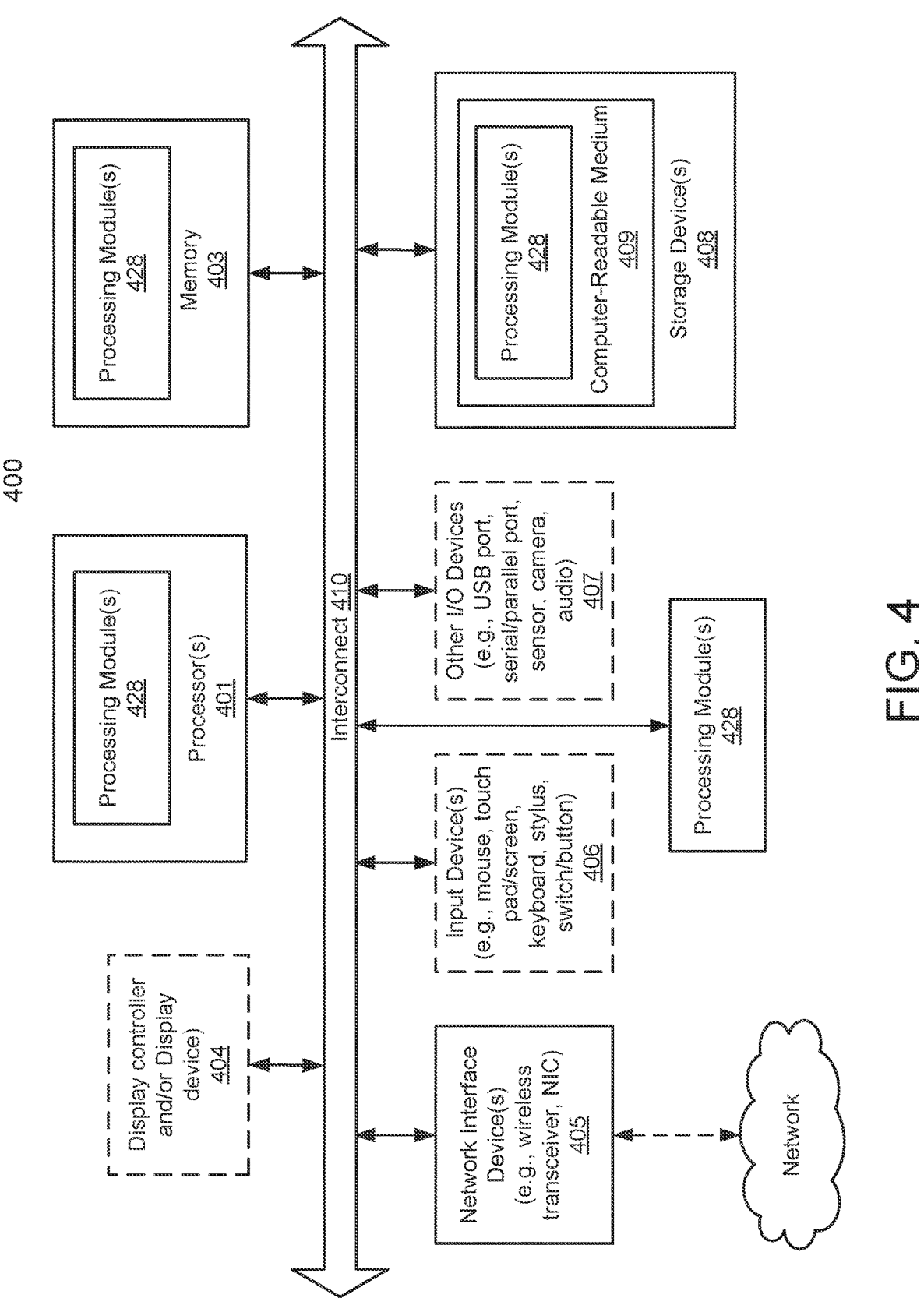
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for securing a deployment, the method comprising:

obtaining a digital twin model for the deployment, the digital twin model being adapted to replicate operation of the deployment in a digital environment;

obtaining a first inference model adapted to select first parameters to disrupt operation of the digital twin model;

obtaining a second inference model adapted to select second parameters to prevent the disruption of the operation of the digital twin model, the second parameters define system-monitoring actions for the second inference model to observe changes in a state of the digital twin model due to the operation of the digital twin model being disrupted by the first inference model and system-remediative actions that are used by the second inference model to implement one or more corrective procedures to reverse or correct the disruption caused by the first inference model;

obtaining a security model for the deployment using the first inference model, the second inference model, and the digital twin model; and deploying the security model to the deployment to secure the deployment.

2. The method of claim 1, wherein obtaining the first inference model comprises:

identifying a type of inference model to select the first parameters; and generating an instance of the type of the inference model.

3. The method of claim 2, wherein identifying the type of inference model comprises:

identifying a first set of manipulable operations of the digital twin model;

identifying first operating metrics of the digital twin model that are monitorable; and using the first set of manipulable operations and the first operating metrics to discriminate the type of the inference model from other types of inference models.

4. The method of claim 1, wherein the first inference model is based on a type of inference model, and the type of the inference model is based on:

a first set of manipulable operations of the digital twin model, and first operating metrics of the digital twin model that are monitorable.

5. The method of claim 1, wherein obtaining the second inference model comprises:

identifying a type of inference model to select the second parameters; and generating an instance of the type of the inference model.

6. The method of claim 5, wherein identifying the type of inference model comprises:

identifying a second set of manipulable operations of the digital twin model;

identifying second operating metrics of the digital twin model that are monitorable; and using the second set of manipulable operations and the second operating metrics to discriminate the type of the inference model from other types of inference models.

7. The method of claim 1, wherein the second inference model is based on a type of inference model, and the type of the inference model is based on:

a second set of manipulable operations of the digital twin model, and second operating metrics of the digital twin model that are monitorable.

8. The method of claim 1, wherein obtaining the security model for deployment comprises:

performing iterative computations with the first inference model and the second inference model to obtain a set of security models;

ranking the security models based on performance criteria to obtain a rank ordering of the security models; and selecting the security model for deployment based on the rank ordering.

9. The method of claim 8, wherein performing iterative computations with the first inference model and the second inference model to obtain the set of security models comprises:

running training cycles with the first inference model with the digital twin model;

running training cycles with the second inference model with the digital twin model; and producing a security model optimized for performance through training cycles with the first inference model and second inference model.

10. The method of claim 9, wherein running training cycles with the first inference model with the digital twin model comprises:

selecting the first parameters;

running the first inference model using the first parameters;

obtaining operating metrics from the first inference model using the first parameters; and using the operating metrics to update operation of the first inference model to select a new set of first parameters.

11. The method of claim 9, wherein running training cycles with the second inference model with the digital twin model comprises:

selecting the second parameters;

running the second inference model using the second parameters;

obtaining operating metrics from the second inference model using the second parameters; and using the operating metrics to update operation of the second inference model to select a new set of second parameters.

12. The method of claim 1, wherein the second inference model being obtained from a second inference model set comprising a plurality of second inference models where each of the plurality of second inference models making up the second inference model set is specifically configured to monitor and remediate at least one type of disruption among different types of the disruption caused by the first inference model.

13. The method of claim 1, wherein the second inference model being a highest ranked model, among a second inference model set comprising a plurality of second inference models, for preventing a type of disruption associated with the first parameters selected by the first inference model to disrupt operations of the digital twin model.

14. A non-transitory machine-readable medium having instructions stored therein, which when executed by a processor, cause the processor to perform operations for securing a deployment, the operations comprising:

obtaining a digital twin model for the deployment, the digital twin model being adapted to replicate operation of the deployment in a digital environment;

obtaining a first inference model adapted to select first parameters to disrupt operation of the digital twin model;

obtaining a second inference model adapted to select second parameters to prevent the disruption of the operation of the digital twin model, the second parameters define system-monitoring actions for the second inference model to observe changes in a state of the digital twin model due to the operation of the digital twin model being disrupted by the first inference model and system-remediative actions that are used by the second inference model to implement one or more corrective procedures to reverse or correct the disruption caused by the first inference model;

obtaining a security model for the deployment using the first inference model, the second inference model, and the digital twin model; and deploying the security model to the deployment to secure the deployment.

15. The non-transitory machine-readable medium of claim 14, wherein obtaining the first inference model comprises:

identifying a type of inference model to select the first parameters; and generating an instance of the type of the inference model.

16. The non-transitory machine-readable medium of claim 15, wherein identifying the type of inference model comprises:

identifying a first set of manipulable operations of the digital twin model;

identifying first operating metrics of the digital twin model that are monitorable; and using the first set of manipulable operations and the first operating metrics to discriminate the type of the inference model from other types of inference models.

17. The non-transitory machine-readable medium of claim 14, wherein the first inference model is based on a type of inference model, and the type of the inference model is based on:

a first set of manipulable operations of the digital twin model, and first operating metrics of the digital twin model that are monitorable.

18. The non-transitory machine-readable medium of claim 14, wherein obtaining the second inference model comprises:

identifying a type of inference model to select the second parameters; and generating an instance of the type of the inference model.

19. A data processing system, comprising:

a processor; and a memory coupled to the processor to store instructions, which when executed by the processor, cause the processor to perform operations for securing a deployment, the operations comprising:

obtaining a digital twin model for the deployment, the digital twin model being adapted to replicate operation of the deployment in a digital environment;

obtaining a first inference model adapted to select first parameters to disrupt operation of the digital twin model;

obtaining a second inference model adapted to select second parameters to prevent the disruption of the operation of the digital twin model, the second parameters define system-monitoring actions for the second inference model to observe changes in a state of the digital twin model due to the operation of the digital twin model being disrupted by the first inference model and system-remediative actions that are used by the second inference model to implement one or more corrective procedures to reverse or correct the disruption caused by the first inference model;

obtaining a security model for the deployment using the first inference model, the second inference model, and the digital twin model; and deploying the security model to the deployment to secure the deployment.

20. The data processing system of claim 19, wherein obtaining the first inference model comprises:

identifying a type of inference model to select the first parameters; and generating an instance of the type of the inference model.

\* \* \* \* \*